J. L. BUSKETT.
Cultivator.

No. 218,482. Patented Aug. 12, 1879.

Witnesses:
T. Walter Fowler,
W. H. Morsell

Inventor:
James L. Buskett
by his att'ys
A. H. Evans & Co.

UNITED STATES PATENT OFFICE.

JAMES L. BUSKETT, OF ST. LOUIS, MISSOURI.

IMPROVEMENT IN CULTIVATORS.

Specification forming part of Letters Patent No. 218,482, dated August 12, 1879; application filed June 28, 1879.

*To all whom it may concern:*

Be it known that I, JAMES L. BUSKETT, of St. Louis, Missouri, have invented a new and useful Improvement in Cultivators; and I hereby declare the following to be a full, clear, and exact description thereof, reference being had to the accompanying drawings, making a part of this specification, in which—

Figure 1:
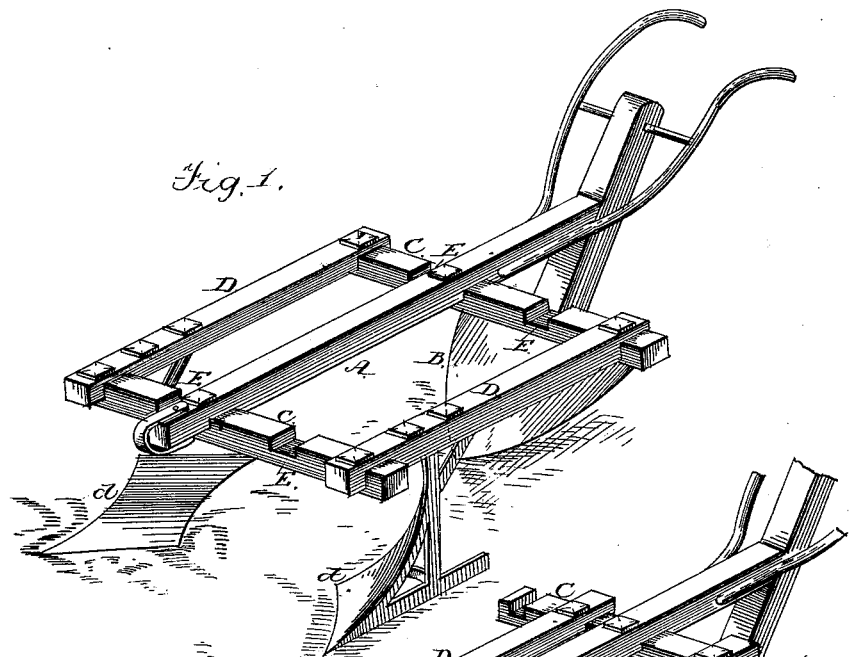
Figure 2:
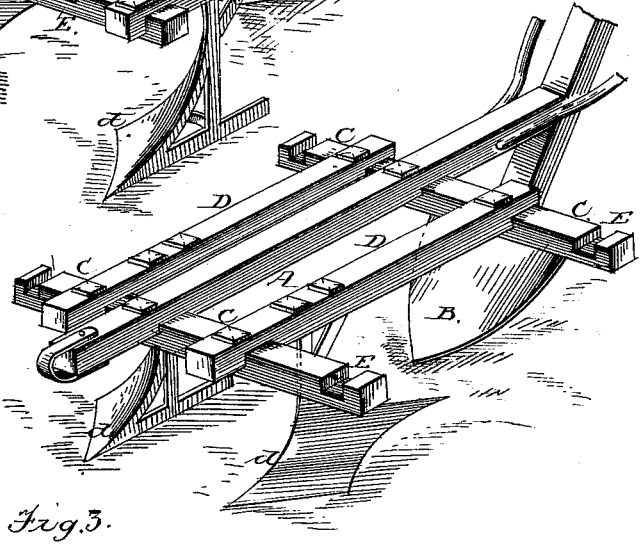
Figure 3:
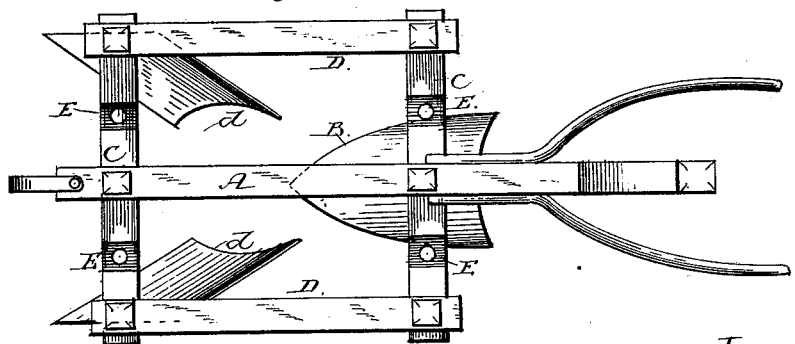

Figure 1 is a perspective view of a cultivator with my improvements attached. Fig. 2 is the same, with the forward plows reversed. Fig. 3 is a plan view.

My invention relates to that class of cultivators used for cultivating corn, cotton, potatoes, &c.; and it consists in the combination of devices hereinafter explained and claimed.

To enable others skilled in the art to make and use my invention, I will proceed to describe the exact manner in which I have carried it out.

In the drawings, A represents the main plow-beam, to which is attached the shovel-plow B. To this beam is attached the two cross-bars C C. These bars are notched, for a purpose hereinafter explained. On the outer ends of these bars are secured the supplemental beams D D, each carrying a plowshare, *d d*, as shown in Fig. 1, the bar set to run next the row to be cultivated, and throwing the earth from that row toward the center, the shovel-plow B following and cultivating the middle, and throwing the earth back to the row, thus avoiding the covering up or injuring of the growing crop.

The beams are attached by bolts and nuts, and are made interchangeable, and when it is required to throw the earth outward by the plowshares, so as to bank the earth against the plants at the last plowing, it is only necessary to transpose the beams, and place them in notches E E, as shown in Fig. 2.

It is evident that this adjustability may be attained by having the bars C C made of any suitable material, and passed through the beams D D, being secured in position by an ordinary set-screw, or other convenient means. This construction would admit of a much greater scope of adjustment; but for illustrating my invention I have preferred to show the notched bars.

In construction, the shovel-plow should be made longer than the plowshares, so as to plow deeper in the middle of the row than next the growing plants, the object of the plowshares being to cultivate the earth close up to the roots without danger of covering or damaging the growing corn or other crop, while the shovel-plow is intended to plow deeper, and throw the pulverized soil back to the row.

It is also evident that by detaching the cross-bars C C from the beam A, I convert my plow into an ordinary shovel-plow, ready for use as such.

I am aware that heretofore cultivators have been made with a pair of adjustable beams carrying shares, in combination with an intermediate shovel-plow, whereby the earth is thrown from a row of plants by the shares, and returned by the shovel-plow.

I am also aware that heretofore cultivators have been made wherein shares are attached to interchangeable beams to change the direction of the throw of the plows, and hence I claim neither of these features broadly; but Having thus explained my invention, what I claim as new, and desire to secure by Letters Patent, is—

The fixed central beam A bearing a shovel-plow at its rear end, and provided with cross-bars C C bolted permanently to it, said bars being provided with recesses E E, in combination with two removable reversible beams, D D, carrying land-side shares near their forward ends, and capable of adjustment as a cultivator, ridger, or single-shovel plow, as set forth.

J. L. BUSKETT.

Witnesses:
GEO. H. EVANS,
W. F. MORSELL.